UNITED STATES PATENT OFFICE.

ANTHONY ROTH, OF YONKERS, NEW YORK, ASSIGNOR OF ONE-HALF TO HENRY SEIFRIED, OF YONKERS, NEW YORK.

SMOKED MEAT.

1,025,925.  Specification of Letters Patent.  Patented May 7, 1912.

No Drawing.  Application filed October 21, 1911.  Serial No. 655,844.

*To all whom it may concern:*

Be it known that I, ANTHONY ROTH, a citizen of the United States, and a resident of Yonkers, in the county of Westchester and State of New York, have invented a new and Improved Smoked Meat, of which the following is a full, clear, and exact description.

The object of the invention is to provide a new and improved smoked meat provided with a coating to prevent the formation of mold on the meat and shrinkage of the latter.

For the purpose mentioned the coating is formed of the following ingredients in about the proportions mentioned:

| | | |
|---|---|---|
| Oil of juniper berries | 2 | grains |
| Glycerin | 10 | " |
| Molasses | 12 | ounces |
| Comb honey | 4 | " |
| Mutton fat | 10 | grains |

The mutton fat acts as a filler. These ingredients are placed in a heated vat to form a liquid mixture kept at a temperature of about 140° F., and into this heated mixture the meat is dipped, to coat it with the mixture, the latter readily congealing on the meat after the dipping to form an impervious envelop around the meat with a view to prevent the escape of moisture from the meat, or moisture settling on the meat, thus preventing the formation of mold and reducing shrinkage of the meat to a minimum.

Having thus described my invention, I claim as new and desire to secure by Letters Patent:

1. As an article of manufacture, smoked meat having a coating congealed on the surface of the meat and impervious to moisture from within or from without the meat, the coating being formed of oil of juniper berries, glycerin, molasses, honey, and a filler.

2. As an article of manufacture, smoked meat having a coating congealed on the surface of the meat and impervious to moisture from within or from without the meat, the coating being formed of oil of juniper berries, glycerin, molasses, honey and mutton fat.

In testimony whereof I have signed my name to this specification in the presence of two subscribing witnesses.

ANTHONY ROTH.

Witnesses:
 THEO. G. HOSTER,
 PHILIP D. ROLLHAUS.

Copies of this patent may be obtained for five cents each, by addressing the "Commissioner of Patents, Washington, D. C."